United States Patent [19]

Komatsu et al.

[11] 4,407,970
[45] Oct. 4, 1983

[54] SINTERED BODY OF CERAMICS AND PREPARATION THEREOF

[75] Inventors: Michiyasu Komatsu; Akihiko Tsuge; Hiroyasu Ota, all of Yokohama, Japan

[73] Assignee: Tokyo Shibaura Denki Kabushiki Kaisha, Kawasaki, Japan

[21] Appl. No.: 406,440

[22] Filed: Aug. 9, 1982

[30] Foreign Application Priority Data

Aug. 10, 1981 [JP] Japan ................................ 56-124102

[51] Int. Cl.$^3$ ...................... C04B 35/50; C04B 35/58
[52] U.S. Cl. .......................................... 501/97; 501/98
[58] Field of Search ................................... 501/97, 98

[56] References Cited

U.S. PATENT DOCUMENTS

| | | | |
|---|---|---|---|
| 3,409,416 | 11/1968 | Yates | 29/182.5 |
| 3,409,417 | 11/1968 | Yates | 29/182.5 |
| 3,830,652 | 8/1974 | Gazza | 501/98 |
| 3,953,221 | 4/1976 | Lange | 501/98 |
| 3,969,125 | 7/1976 | Komeya et al. | 501/126 |
| 3,991,148 | 11/1976 | Lumby et al. | 501/97 |
| 4,066,468 | 1/1978 | Kamigaito | 501/98 |
| 4,113,503 | 9/1978 | Lumby et al. | 501/98 |
| 4,127,416 | 11/1978 | Lumby et al. | 501/126 |
| 4,143,107 | 3/1979 | Ishii et al. | 501/98 |
| 4,218,257 | 9/1980 | Oda et al. | 106/73.5 |
| 4,327,187 | 4/1982 | Komatsu et al. | 501/97 |
| 4,332,909 | 6/1982 | Nishida et al. | 501/97 |

FOREIGN PATENT DOCUMENTS

| | | |
|---|---|---|
| 15421 | 9/1980 | European Pat. Off. . |
| 55-113674 | 9/1980 | Japan . |
| 55-116670 | 9/1980 | Japan . |
| 56-75546 | 6/1981 | Japan . |
| 2063302 | 6/1981 | United Kingdom . |

OTHER PUBLICATIONS

Chem. Abstract, vol. 94, 1981, pp. 299, 317.
European Search Report, Application 82 10 7134.

*Primary Examiner*—Mark Bell
*Attorney, Agent, or Firm*—Schwartz, Jeffery, Schwaab, Mack, Blumenthal & Koch

[57] ABSTRACT

There are disclosed a sintered body of ceramics, comprising 0.1 to 10% by weight of $Y_2O_3$; 0.1 to 10% by weight of $Al_2O_3$; 0.1 to 10% by weight of AlN; 0.1 to 5% by weight of at least one oxide selected from the group consisting of $Li_2O$, BeO, CaO, $V_2O_5$, $MnO_2$, $MoO_3$ and $WO_3$ or a combination of at least one of these oxides with at least one oxide selected from the group consisting of $B_2O_3$, MgO, $TiO_2$, $Cr_2O_3$, CoO, NiO, $ZrO_2$, $Nb_2O_5$, $HfO_2$ and $Ta_2O_5$; and the balance of $Si_3N_4$, and a process for producing a sintered body of ceramics, which comprises molding a powder mixture of the same composition, and sintering the resultant molded compact in a non-oxidative atmosphere.

The process of the present invention requires no hot press and therefore very suitable for bulk production.

12 Claims, No Drawings

SINTERED BODY OF CERAMICS AND PREPARATION THEREOF

BACKGROUND OF THE INVENTION

This invention relates to a sintered body of ceramics composed primarily of silicon nitride and preparation thereof. More particularly, it pertains to a sintered body of ceramics which is high in density, excellent in mechanical strength and impact resistance and also low in the degree of lowering of mechanical strength even under an oxidizing atmosphere for prolonged time at a temperature of about 900° C., and to a process for producing the same.

A sintered body of ceramics, which is excellent in thermal properties and has high density, is now attracting attention as a frontier material among various structural materials widely in various fields of industries. As a typical example, there is a sintered body of silicon nitride.

In the art of production of silicon nitride sintered bodies, there have generally been adopted the reaction sintering method, the hot press method and the ordinary sintering method.

Among them, the reaction sintering method is a method in which metallic silicon powders are molded previously into a desired shape, which is in turn heated gradually in an atmosphere of nitrogen or ammonia gas thereby to be converted into a nitride simultaneously with sintering (see, for example, Proc. of DARPA/NAVSEA, Ceramic Gas Turbine Demonstration Engine Program Review, ed. by W. Fairbanks and R. W. Rice, MCIC Report, March 1978 (MCIC-78-36)).

The hot press method comprises adding a sintering aid (e.g., $Y_2O_3$, MgO, $Al_2O_3$) to the powders of silicon nitride ($Si_3N_4$), and sintering the resultant mixture in a certain mold (e.g., a mold of graphite) at a high temperature of 1700° to 1800° C. by application of a pressure of 500 kg/cm$^2$ (see, for example, Norton Catalog.). According to this method, there can be obtained a sintered product having a high density with greater mechanical strength and also having excellent impact resistance as well as excellent thermal properties with a small degree of lowering of mechanical strength under an oxidizing atmosphere at higher temperatures. However, while this method involves the drawback of difficult fabrication of a complicated and large size sintered body on one hand, it is also disadvantageously inferior in capability of bulk production.

On the other hand, the ordinary sintering method comprises previously molding $Si_3N_4$ powders and a sintering aid together with a binder such as paraffin, and then sintering by heating the compact as such without hot press under a non-oxidative atmosphere (see, for example, GTE Sylvania Catalog. or Carborundum Co. Technical Sheet). According to this method, however, it is difficult to obtain a sintered body having a high density with excellent mechanical strength and impact resistance.

In view of the state of the art as outlined above, the present inventors have made various investigations on the above ordinary sintering method and consequently have proposed an improved ordinary method comparable with the hot press method, which is capable of producing a high density sintered body excellent in mechanical strength and impact resistance (Japanese Provisional Patent Publication Nos. 113674/1980 and 116670/1980).

However, the silicon nitride sintered bodies obtained according to these methods still proved to be unsatisfactory in resistance to lowering of mechanical strength under a high temperature oxidizing atmosphere.

The present inventors have made further extensive studies on the above point and at last accomplished the present invention.

SUMMARY OF THE INVENTION

The object of the present invention is to provide a sintered body of ceramics having a high density and excellent impact resistance, which is also small in lowering of mechanical strength under an oxidative atmosphere for prolonged time at a temperature of about 900° C., above all a sintered body of ceramics composed primarily of silicon nitride and a process for producing the same.

The sintered body of ceramics according to the present invention comprises 0.1 to 10% by weight of yttrium oxide ($Y_2O_3$); 0.1 to 10% by weight of aluminum oxide ($Al_2O_3$); 0.1 to 10% by weight of aluminum nitride (AlN); 0.1 to 5% by weight of at least one oxide selected from the group consisting of lithium oxide ($Li_2O$), beryllium oxide (BeO), calcium oxide (CaO), vanadium oxide ($V_2O_5$), manganese oxide ($MnO_2$), molybdenum oxide ($MoO_3$) and tungsten oxide ($WO_3$) or a combination of at least one of these oxides with at least one oxide selected from the group consisting of boron oxide ($B_2O_3$), magnesium oxide (MgO), titanium oxide ($TiO_2$), chromium oxide ($Cr_2O_3$), cobalt oxide (CoO), nickel oxide (NiO), zirconium oxide ($ZrO_2$), niobium oxide ($Nb_2O_5$), hafnium oxide ($HfO_2$) and tantalum oxide ($Ta_2O_5$); and the balance being silicon nitride ($Si_3N_4$).

DETAILED DESCRIPTION OF PREFERRED EMBODIMENTS

The sintered body of ceramics according to the present invention is constituted primarily of $Si_3N_4$, which may preferably be contained in an amount of 70% by weight or more, more preferably 80 to 90% by weight. There may be employed either α-phase type or β-phase type $Si_3N_4$, or a mixture thereof but preferably α-phase type.

Both $Y_2O_3$ and $Al_2O_3$ function as sintering promoters. Both of these components are contained in amounts of 0.1 to 10% by weight. Preferably, both $Y_2O_3$ and $Al_2O_3$ may be contained in an amount of 0.5 to 8% by weight, respectively. These components, at the levels exceeding 10% by weight, will undesirably lower the mechanical strength and impact resistance of the resultant sintered body. It is generally preferred that the sum of the contents of both components should be within the range from 3 to 15% by weight, more preferably 4 to 10% by weight.

AlN has the function to suppress evaporation of the primary component $Si_3N_4$ during the sintering procedure and it also contributes to promotion of sintering as a whole by formation of a liquid phase useful for sintering through the reaction with other components. The content of AlN may be 0.1 to 10% by weight, preferably 0.5 to 8% by weight. At a level in excess of 10% by weight, the resultant sintered body will be lowered in mechanical strength and impact resistance.

The oxides such as $Li_2O$, BeO, $B_2O_3$, MgO, CaO, $TiO_2$, $V_2O_5$, $Cr_2O_3$, $MnO_2$, CoO, NiO, $ZrO_2$, $MoO_3$, $Nb_2O_5$, $HfO_2$, $Ta_2O_5$ and $WO_3$ all function to aid the sintering promoters of $Y_2O_3$ and $Al_2O_3$. Further, the oxides such as $Li_2O$, BeO, CaO, $V_2O_5$, $MnO_2$, $MoO_3$ and $WO_3$ have the function to protect the resultant sintered body against lowering in mechanical strength, since these oxides will form protective coated films with great oxidation resistance on the surface of the sintered body under an oxidative atmosphere at a temperature of about 900° C. In particular, $Li_2O$, BeO, and $V_2O_5$ will contribute very much to that effect. These oxides may be contained in an amount of 0.1 to 5% by weight, preferably 0.25 to 3% by weight. But, when the content of these oxides exceeds 5% by weight, the sintered body may contrariwise be disadvantageously lowered in mechanical strength and impact resistance.

The process for producing the sintered body of ceramics according to the present invention comprises molding a powder mixture comprising 0.1 to 10% by weight of yttrium oxide ($Y_2O_3$) powders; 0.1 to 10% by weight of aluminum oxide ($Al_2O_3$) powders; 0.1 to 10% by weight of aluminum nitride (AlN) powders; 0.1 to 5% by weight of at least one powdery oxide selected from the group consisting of lithium oxide ($Li_2O$), beryllium oxide (BeO), calcium oxide (CaO), vanadium oxide ($V_2O_5$), manganese oxide ($MnO_2$), molybdenum oxide ($MoO_3$) and tungsten oxide ($WO_3$) or a combination of at least one of these powdery oxides with at least one powdery oxide selected from the group consisting of boron oxide ($B_2O_3$), magnesium oxide (MgO), titanium oxide ($TiO_2$), chromium oxide ($Cr_2O_3$), cobalt oxide (CoO), nickel oxide (NiO), zirconium oxide ($ZrO_2$), niobium oxide ($Nb_2O_5$), hafnium oxide ($HfO_2$) and tantalum oxide ($Ta_2O_5$); and the balance of silicon nitride ($Si_3N_4$) powders, and sintering the resultant compact in a non-oxidative amosphere.

In the process according to the present invention, these components may be mixed by means of a pulverizing mixer, using a solvent such as n-butyl alcohol.

The powder mixture thus prepared is admixed with a binder such as paraffin, etc. and molded into a desired shape by application of a suitable pressure.

The compact is then sintered by heating at 1500 to 1900° C., preferably at 1600° to 1800° C., in a non-oxidative atmosphere to be converted to a sintered body. As a non-oxidative atmopsphere, there may be mentioned a non-oxidative atmosphere of nitrogen, argon, etc. No oxidative atmopsphere can be used, since $Si_3N_4$ will be oxidized to $SiO_2$ in such an atmosphere. The sintering may also be effected under a hot press condition by application of a pressure of 50 to 500 Kg/cm², or under the pressurized condition in a non-oxidative gas atmosphere. Alternatively, the characteristics of the sintered body will not be changed if sintering may be effected by the ordinary sintering method, followed by sintering under pressurized atmosphere or by HIP method (Hot Isostatic Pressing method) (see, for example, H. Larker et al, SAE Paper 770335, Detroit, February 1977).

The present invention is described in further detail by referring to the following Examples and Reference examples.

EXAMPLES 1–16

There were prepared 16 kinds of powdery mixtures as Examples according to the present invention by formulating the respective components at predetermined proportions (% by weight) as indicated in Table 1 and then, after addition of n-butyl alcohol to each formulation, blending the mixtures in a rubber-lined ball mill for 24 hours, respectively. The powders of $Si_3N_4$ comprises powders with an average particle diameter of $1.2\mu$ containing 85% of α-phase type $Si_3N_4$.

The powders of $Y_2O_3$, $Al_2O_3$, AlN and various oxides had average diameters of $1.0\mu$, $0.5\mu$, $1.5\mu$ and $1.0\mu$, respectively.

After 7% by weight of paraffin was further added to each of the resultant powdery mixtures, each mixture was molded under a molding pressure of 700 kg/cm² into a plate of 60 mm in length, 40 mm in width and 10 mm in thickness. Each compact obtained was subjected to heat treatment to remove the paraffin by pyrolysis and then sintered at 1750° C. under a nitrogen gas stream at 3 liter/min.

Each sintered body was tested for relative density, flexural strength under room temperature, flexural strengths under room temperature after treatment in the air at 900° C. for 100 hours, 1000 hours and 5000 hours, respectively, and impact resistance.

The results obtained are shown as Examples 1–16 in Table 1. The respective measurement items were conducted according to the following methods.

Relative density (%): indicated in terms of the relative percent of found density relative to the theoretical density calculated by the composition ratio.

Flexural strengh (kg/mm²): measured according to the three point flexural strength test, with a strip size of 3×3×30 mm, a cross-head speed at 0.5 mm/min., a span of 20 mm, at room temperature; four test strips were measured for each sample.

Impact resistance ($\Delta T$; °C.): a strip with the same shape as that for measurement of flexural strength was heated to a certain temperature, followed by quenching by throwing into water, and the presence of cracks generated on the test strip was observed; impact resistance is indicated in terms of $\Delta T$ the difference between the heating temperature when crack was generated and the temperature of water.

REFERENCE EXAMPLES 1–11

There were obtained 11 kinds of sintered body according to the same procedure as in Examples except for using the starting materials having the compositions as indicated in Table 1.

Each sintered body obtained was subjected to measurement of relative density, flexural strength and impact resistance according to the same methods as described in the above Examples.

The results are also shown as Reference examples 1–11 in Table 1.

TABLE 1

| Sample | Starting material composition (wt. %) | | | | | | Relative density (%) | Flexural strength (kg/mm²) | | | | ΔT (°C.) |
|---|---|---|---|---|---|---|---|---|---|---|---|---|
| | Si₃N₄ | Y₂O₃ | Al₂O₃ | AlN | Other component | | | Before oxidation | 900° C. Oxidation treatment | | | |
| | | | | | | | | | After 100 hr. | After 1000 hr. | After 500 hr. | |
| Example 1 | 75 | 10 | 5 | 5 | Li₂O | 5 | 99.7 | 86 | 90 | 88 | 80 | 7000 |
| Example 2 | 87.5 | 5 | 3.5 | 3.5 | Li₂O | 0.5 | 98.6 | 97 | 99 | 95 | 84 | 800 |
| Example 3 | 89 | 2 | 5 | 7 | Li₂O | 2 | 98.5 | 82 | 88 | 85 | 82 | 700 |
| Example 4 | 87.5 | 5 | 3.5 | 3.5 | BeO | 0.5 | 98.5 | 95 | 95 | 92 | 89 | 775 |
| Example 5 | 85.75 | 10 | 2 | 2 | CaO | 0.25 | 98.8 | 90 | 92 | 89 | 80 | 725 |
| Example 6 | 82.5 | 0.5 | 10 | 2 | V₂O₅ | 5 | 97.0 | 80 | 80 | 80 | 75 | 700 |
| Example 7 | 87.5 | 5 | 3.5 | 3.5 | MnO₂ | 0.5 | 98.2 | 93 | 90 | 84 | 80 | 775 |
| Example 8 | 83.5 | 5 | 0.5 | 10 | MoO₃ | 1 | 97.5 | 82 | 85 | 80 | 73 | 700 |
| Example 9 | 87.5 | 5 | 3.5 | 3.5 | WO₃ | 0.5 | 99.0 | 95 | 92 | 85 | 80 | 800 |
| Example 10 | 87.25 | 5 | 3.5 | 3.5 | TiO₂ Li₂O CaO | 0.25 0.25 0.25 | 99.8 | 98 | 99 | 97 | 88 | 800 |
| Example 11 | 86 | 2 | 5 | 2 | NiO Cr₂O₃ BeO B₂O₃ ZrO₂ | 1 1 1 1 1 | 99.7 | 95 | 93 | 90 | 82 | 700 |
| Example 12 | 87.5 | 5 | 3.5 | 3.5 | CoO V₂O₅ Nb₂O₅ WO₃ MgO | 0.1 0.1 0.1 0.1 0.1 | 99.0 | 96 | 90 | 87 | 83 | 750 |
| Example 13 | 86 | 5 | 2 | 2 | HfO₂ CaO | 2.5 2.5 | 98.3 | 89 | 92 | 88 | 80 | 700 |
| Example 14 | 86.5 | 5 | 2 | 3.5 | MnO₂ Li₂O MoO₃ | 0.5 2 0.5 | 98.0 | 92 | 87 | 85 | 82 | 725 |
| Example 15 | 85 | 5 | 3.5 | 3.5 | Ta₂O₅ MoO₃ | 1 2 | 99.2 | 98 | 97 | 95 | 87 | 750 |
| Example 16 | 90.5 | 2 | 2 | 0.5 | BeO TiO₂ | 3 2 | 97.0 | 85 | 88 | 88 | 85 | 750 |
| Reference example 1 | 87.5 | 5 | 3.5 | 3.5 | TiO₂ | 0.5 | 98.7 | 100 | 95 | 90 | 78 | 800 |
| Reference example 2 | 87.5 | 5 | 3.5 | 3.5 | ZrO₂ | 0.5 | 98.0 | 90 | 82 | 80 | 65 | 725 |
| Reference example 3 | 86.5 | 5 | 3.5 | 3.5 | TiO₂ ZrO₂ MgO | 0.5 0.5 0.5 | 99.4 | 95 | 88 | 82 | 63 | 700 |
| Reference example 4 | 88 | 5 | 5 | — | Li₂O | 2 | 94.6 | 70 | 75 | 70 | 68 | 650 |
| Reference example 5 | 85 | 5 | — | 5 | CaO | 5 | 93.8 | 75 | 72 | 72 | 70 | 675 |
| Reference example 6 | 80 | — | 10 | 5 | BeO | 5 | 78.9 | 40 | 42 | 38 | 35 | 650 |
| Reference example 7 | 80 | 5 | 3.5 | 3.5 | CaO | 8 | 99.8 | 80 | 79 | 79 | 75 | 525 |
| Reference example 8 | 83 | 2 | 5 | 2 | V₂O₅ | 8 | 99.5 | 75 | 78 | 75 | 70 | 500 |
| Reference example 9 | 79 | 15 | 2 | 2 | Li₂O | 2 | 99.0 | 85 | 89 | 83 | 78 | 575 |
| Reference example 10 | 76 | 10 | 10 | 2 | MoO₃ | 2 | 99.5 | 80 | 85 | 82 | 75 | 550 |
| Reference example 11 | 76 | 2 | 5 | 15 | WO₃ | 2 | 96.8 | 70 | 68 | 65 | 60 | 500 |

As seen from Table 1, the sintered bodies obtained according to the process of the present invention (Examples 1-16) all have high densities with relative densities being 95% or higher relative to the theoretical density, and also have great flexural strengths of 80 kg/cm² or more and high impact resistance in terms of ΔT of 700° C. or more. Above all, it has been found that the lowering of flexural strength is very small even after the oxidation treatment at 900° C. for 5000 hours.

EXAMPLES 17-20

Of the sintered bodies obtained in the foregoing examples, 4 kinds of sintered bodies of Examples 2, 4, 10 and 11 were further subjected to sintering treatment according to the HIP method in an atmosphere of nitrogen at 1750° C. under a pressure of 1000 to 3000 atm.

Each sintered body obtained was tested for relative density, flexural strength and impact resistance to obtain the results as shown in Table 2.

REFERENCE EXAMPLES 12-15

Of the sintered bodies obtained in the foregoing Reference Examples, 4 kinds of sintered bodies of Reference examples 1, 7, 9 and 11 were further subjected to sintering treatment according to the HIP method similarly as in Examples 17-20, and each sintered body obtained was tested for relative density, flexural strength and impact resistance to obtain the results which are also shown in Table 2.

TABLE 2

| Sample | Starting material composition Example or Reference example No. | Relative density (%) | Flexural strength (kg/mm²) | | | | ΔT (°C.) |
|---|---|---|---|---|---|---|---|
| | | | Before oxidation | 900° C. Oxidation treatment | | | |
| | | | | After 100 hr. | After 1000 hr. | After 5000 hr. | |
| Example 17 | Example 2 | 99.9< | 110 | 115 | 105 | 93 | 850 |
| Example 18 | Example 4 | 99.9< | 108 | 108 | 105 | 98 | 825 |
| Example 19 | Example 10 | 99.9< | 105 | 109 | 102 | 95 | 800 |
| Example 20 | Example 11 | 99.9< | 110 | 108 | 102 | 97 | 750 |
| Reference example 12 | Reference example 1 | 99.9< | 115 | 100 | 92 | 80 | 850 |
| Reference example 13 | Reference example 7 | 99.9< | 82 | 80 | 80 | 75 | 550 |
| Reference example 14 | Reference example 9 | 99.9< | 90 | 91 | 84 | 80 | 600 |
| Reference example 15 | Reference example 11 | 99.9< | 76 | 72 | 69 | 65 | 525 |

As described in detail above, the process of the present invention requires no hot press and is therefore very suitable for bulk production. Moreover, accordingly to the process of the present invention, it is possible to manufacture sintered bodies having high density and excellent impact resistance, with only a small degree of lowering of mechanical strength under an oxidative atmosphere at about 900° C., to provide a great advantage in industrial application.

We claim:

1. A sintered body of ceramics, comprising 0.1 to 10% by weight of yttrium oxide ($Y_2O_3$); 0.1 to 10% by weight of aluminum oxide ($Al_2O_3$); 0.1 to 10% by weight of aluminum nitride (AlN); 0.1 to 5% by weight of at least one first oxide selected from the group consisting of lithium oxide ($Li_2O$), beryllium oxide (BeO), calcium oxide (CaO), vanadium oxide ($V_2O_5$), manganese oxide ($MnO_2$), molybdenum oxide ($MoO_3$) and tungsten oxide ($WO_3$) or a combination of at least one of these first oxides with at least one second oxide selected from the group consisting of boron oxide ($B_2O_3$), magnesium oxide (MgO), titanium oxide ($TiO_2$), chromium oxide ($Cr_2O_3$), cobalt oxide (CoO), nickel oxide (NiO), zirconium oxide ($ZrO_2$), niobium oxide ($Nb_2O_5$), hafnium oxide ($HfO_2$) and tantalum oxide ($Ta_2O_5$); and the balance being silicon nitride ($Si_3N_4$).

2. A sintered body of ceramics according to claim 1, wherein said sintered body comprises 0.5 to 8% by weight of yttrium oxide; 0.5 to 8% by weight of aluminum oxide; 0.5 to 8% by weight of aluminum nitride; 0.25 to 3% by weight of at least one first oxide selected from the group consisting of lithium oxide, beryllium oxide, calcium oxide, vanadium oxide, manganese oxide, molybdenum oxide and tungsten oxide or a combination of at least one of these first oxides with at least one second oxide selected from the group consisting of boron oxide, magnesium oxide, titanium oxide, chromium oxide, cobalt oxide, nickel oxide, zirconium oxide, niobium oxide, hafnium oxide and tantalum oxide; and the balance being silicon nitride.

3. A sintered body of ceramics according to claim 1, produced by the process comprising the steps of: molding a powder mixture comprising 0.1 to 10% by weight of yttrium oxide ($Y_2O_3$) powders; 0.1 to 10% by weight of aluminum oxide ($Al_2O_3$) powders; 0.1 to 10% by weight of aluminum nitride (AlN) powders; 0.1 to 5% by weight of at least one first powdery oxide selected from the group consisting of lithium oxide ($Li_2O$), beryllium oxide (BeO), calcium oxide (CaO), vanadium oxide ($V_2O_5$), manganese oxide ($MnO_2$), molybdenum oxide ($MoO_3$) and tungsten oxide ($WO_3$) or a combination of at least one of these first powdery oxides with at least one second powdery oxide selected from the group consisting of boron oxide ($B_2O_3$), magnesium oxide (MgO), titanium oxide ($TiO_2$), chromium oxide ($Cr_2O_3$), cobalt oxide (CoO), nickel oxide (NiO), zirconium oxide ($ZrO_2$), niobium oxide ($Nb_2O_5$), hafnium oxide ($HfO_2$) and tantalum oxide ($Ta_2O_5$), and the balance of silicon nitride ($Si_3N_4$) powders; and sintering the resultant compact in a non-oxidative atmosphere at a temperature between about 1500° C. and 1900° C.

4. A sintered body of ceramics according to claim 2, produced by the process comprising the steps of: molding a powder mixture comprising 0.5 to 8% by weight of yttrium oxide powders; 0.5 to 8% by weight of aluminum oxide powders; 0.5 to 8% by weight of aluminum nitride powders; 0.25 to 3% by weight of at least one first powdery oxide selected from the group consisting of lithium oxide, beryllium oxide, calcium oxide, vanadium oxide, manganese oxide, molybdenum oxide and tungsten oxide or a combination of at least one of these first powdery oxides with at least one second powdery oxide selected from the group consisting of boron oxide, magnesium oxide, titanium oxide, chromium oxide, cobalt oxide, nickel oxide, zirconium oxide, niobium oxide, hafnium oxide and tantalum oxide; and the balance of silicon nitride powders; and sintering the resultant compact in a non-oxidative atmosphere at a temperature of between about 1500° C. and 1900° C.

5. A sintered body of ceramics according to claim 1, wherein the first oxide comprises lithium oxide, beryllium oxide or vanadium oxide.

6. A sintered body of ceramics according to claim 2, wherein the first oxide comprises lithium oxide, beryllium oxide or vanadium oxide.

7. A sintered body of ceramics according to claim 1, wherein the silicon nitride comprises at least about 70% by weight of the ceramic.

8. A sintered body of ceramics according to claim 1, wherein the silicon nitride comprises between about 80 and 90% by weight of the ceramic.

9. A sintered body of ceramics according to claim 1, wherein the silicon nitride compises a major proportion of alpha-phase silicon nitride.

10. A sintered body of ceramics according to claim 1, wherein the combined content of the yttrium oxide and aluminum oxide is between about 3 and 15% by weight.

11. A sintered body of ceramics according to claim 10, wherein the combined content of the yttrium oxide and aluminum oxide is between about 4 and 10% by weight.

12. A sintered body of ceramics according to claim 1, having a relative density of at least about 95% relative to the theoretical density, a flexural strength of at least about 80 kg/cm² and an impact resistance ΔT of at least about 700° C.

* * * * *